(12) United States Patent
Chen et al.

(10) Patent No.: US 8,394,174 B2
(45) Date of Patent: Mar. 12, 2013

(54) PROCESSES FOR THE RECOVERY OF HIGH PURITY HYDROGEN AND HIGH PURITY CARBON DIOXIDE

(75) Inventors: Yudong Chen, Garnet Valley, PA (US); Glenn Fair, Katy, TX (US)

(73) Assignees: American Air Liquide, Inc., Fremont, CA (US); Air Liquide Industrial U.S. LP, Houston, TX (US)

(*) Notice: Subject to any disclaimer, the term of this patent is extended or adjusted under 35 U.S.C. 154(b) by 560 days.

(21) Appl. No.: 12/570,361

(22) Filed: Sep. 30, 2009

(65) Prior Publication Data

US 2010/0287981 A1 Nov. 18, 2010

Related U.S. Application Data

(60) Provisional application No. 61/179,225, filed on May 18, 2009.

(51) Int. Cl.
*B01D 53/22* (2006.01)
*B01D 53/047* (2006.01)
*C01B 31/20* (2006.01)
*C01B 3/12* (2006.01)

(52) U.S. Cl. .......... 95/45; 95/51; 95/55; 95/96; 95/116; 95/139; 95/148; 96/4; 96/131; 96/133; 96/136; 96/143; 423/418.2; 423/437.2; 423/655; 62/619

(58) Field of Classification Search ................ 95/45, 51, 95/55, 56, 95, 96, 116, 139, 148; 96/4, 108, 96/131, 132, 133, 136, 143; 423/418.2, 437.1, 423/437.2, 648.1, 655; 62/619
See application file for complete search history.

(56) References Cited

U.S. PATENT DOCUMENTS 4,836,833 A 6/1989 Nicholas et al.
4,952,223 A 8/1990 Kirshnamurthy et al.
4,963,339 A * 10/1990 Krishnamurthy et al. . 423/437.2
5,000,925 A 3/1991 Krishnamurthy et al.

(Continued)

FOREIGN PATENT DOCUMENTS

WO 00/27505 5/2000
WO 2006054008 5/2006

(Continued)

OTHER PUBLICATIONS

Nyserda, "Hydrogen Production—Steam Methan Reforming (SMR)", Hydrogen Fact Sheet, New York Power Authority, Albany, NY, www.nyserda.org.

(Continued)

*Primary Examiner* — Jason M Greene
(74) *Attorney, Agent, or Firm* — Elwood L. Haynes (57) ABSTRACT

The present invention provides for various processes for recovering high purity gaseous hydrogen and high purity gaseous carbon dioxide from the gas stream produced using steam hydrocarbon reforming, especially steam methane reforming, utilizing a $H_2$ pressure swing adsorption unit in combination with either a $CO_2$ pressure swing adsorption unit in combination with a membrane separation unit or a $CO_2$ pressure vacuum swing adsorption unit in combination with a membrane separation unit. The present invention further relates to a process for optimizing the recovery of carbon dioxide from waste gas streams produced during the hydrogen purification step of a steam hydrocarbon reforming/water gas shift reactor/$H_2$ pressure swing adsorption unit utilizing either a $CO_2$ pressure swing adsorption unit in combination with a membrane separation unit or a $CO_2$ pressure vacuum swing adsorption unit in combination with a membrane separation unit. The present invention even further relates to the apparatus necessary to carry out the various processes of the present invention.

6 Claims, 2 Drawing Sheets

U.S. PATENT DOCUMENTS

| | | | |
|---|---|---|---|
| 5,152,976 A * | 10/1992 | Fong et al. | 423/655 |
| 5,435,836 A * | 7/1995 | Anand et al. | 95/45 |
| 5,669,960 A * | 9/1997 | Couche | 95/96 |
| 5,927,103 A | 7/1999 | Howard | |
| 6,669,916 B2 | 12/2003 | Heim et al. | |
| 7,745,502 B2 * | 6/2010 | Lowe et al. | 423/655 |
| 8,057,773 B2 * | 11/2011 | MacArthur et al. | 423/437.2 |
| 2002/0073845 A1 | 6/2002 | Reddy | |
| 2004/0148264 A1 | 7/2004 | Megan et al. | |
| 2007/0227352 A1 | 10/2007 | Kumar | |
| 2007/0232706 A1 | 10/2007 | Shah et al. | |
| 2008/0308769 A1 | 12/2008 | Marty et al. | |
| 2009/0094894 A1 | 4/2009 | Genkin et al. | |
| 2009/0099269 A1 | 4/2009 | Rigby et al. | |
| 2009/0117024 A1 | 5/2009 | Weedon et al. | |
| 2009/0298957 A1 | 12/2009 | Gauthier et al. | |
| 2010/0037521 A1 * | 2/2010 | Vakil et al. | 48/127.5 |
| 2010/0129284 A1 * | 5/2010 | Niitsuma et al. | 423/437.1 |

FOREIGN PATENT DOCUMENTS

| | | |
|---|---|---|
| WO | 2006097703 | 9/2006 |
| WO | 2008123337 | 10/2008 |

OTHER PUBLICATIONS

U.S. Appl. No. 12/570,346, filed Sep. 30, 2009.
PCT Search Report and Written Opinion for PCT/US2010/034887, Sep. 22, 2010.
PCT Search Report and Written Opinion for PCT/US2010/030445, Sep. 10, 2010.

* cited by examiner

Figure 1: First Embodiment ($CO_2$ PSA Case)

PROCESSES FOR THE RECOVERY OF HIGH PURITY HYDROGEN AND HIGH PURITY CARBON DIOXIDE

The present invention claims priority from U.S. Provisional Patent Application Ser. No. 61/179,225, entitled "Processes For The Recovery of High Purity Hydrogen and High Purity Carbon Dioxide" filed May 18, 2009.

FIELD OF THE INVENTION

The present invention relates to various processes for recovering high purity carbon dioxide from waste gas streams produced during the hydrogen purification step of a steam hydrocarbon reforming unit/water gas shift reactor/$H_2$ pressure swing adsorption unit process.

BACKGROUND

Interest in the recovery of carbon dioxide (hereinafter "$CO_2$") from various $CO_2$ containing gas mixtures has increased due to a variety of factors including the merchant $CO_2$ market, enhanced oil recovery (hereinafter "EOR") and greenhouse gas emissions reduction. The currently available systems for recovering high purity $CO_2$ use a variety of generic and proprietary physical and chemical solvents. Accordingly, the processes utilized for this recovery require a large investment due to equipment costs and also high regeneration energy requirements.

Carbon dioxide containing gas mixtures are produced as waste streams during the production of hydrogen gas from hydrocarbon streams using standard steam hydrocarbon reforming processes (hereinafter "SHR"). The most preferred of the SHR processes involves the production of hydrogen gas from hydrocarbon streams using steam methane reforming (hereinafter "SMR" processes since methane has a higher proportion of hydrogen than other hydrocarbons. More specifically with regard to general SMR processes, a hydrocarbon feed gas is fed into a SMR device where the methane in the feed gas reacts with steam at high temperatures (from about 700° C. to about 1100° C.) in the presence of a metal-based catalyst to produce a mixture of carbon monoxide and hydrogen. The hydrogen yield of this mixture is increased by passing the resulting mixture through a water gas shift reactor which promotes the conversion of carbon monoxide and water into more hydrogen and accordingly a stream that is rich in hydrogen but also contains to a lesser degree carbon dioxide, methane and carbon monoxide. Such units typically operate at a temperature from about 200° C. to about 500° C. In some cases the stream from the SHR will be at a higher temperature so optionally the stream may first be cooled with a heat exchanger before being passed through the water gas shift. The hydrogen rich stream produced is then passed through a $H_2$ pressure swing adsorption unit (hereinafter "$H_2$ PSA") in order to allow for the removal of about 90% or more of the hydrogen present through the use of adsorbents. The removal of the hydrogen results in a waste stream (also commonly referred to as "tail gas") that is purged from the $H_2$ PSA that contains methane, carbon monoxide, carbon dioxide, water, and any unrecovered hydrogen. This differs from the SHR units, with the difference being that the waste stream or tail gas produced in the SHR units contains alkanes of varying size ($C_nH_{2n+2}$) and water. The desire has been to be able to utilize these waste streams more efficiently as in the past they have simply been burned as make up fuel (added to the natural gas used in the SHR process or SMR process).

Recently, a $CO_2$ cryogenic process unit (hereinafter "CPU") process was proposed to capture the $CO_2$ during steam methane reforming pressure swing adsorption off gas (by Air Liquide) in WO 2006/054008. In this process, the waste gas from the CPU plant, which normally contains significant amounts of $H_2$, can be recycled back to the SMR plant for additional $H_2$ production credit. The process requires operation at high pressure and cold temperature though. Therefore, while it may be appropriate to use the $CO_2$ CPU process in a very large scale $CO_2$ recovery plant (>1000 TPD), when applying the $CO_2$ CPU process in a small size $CO_2$ recovery plant (typically 100 to 500 TPD merchant $CO_2$ plants), the energy and maintenance costs are considered to be usually high.

Recovery of $CO_2$ from SMR $H_2$ PSA off gas by using an adsorption process has been proposed by the BOC Group in U.S. Pat. No. 4,963,339 and U.S. Pat. No. 5,000,925 wherein the $CO_2$ was removed using a $CO_2$ PSA unit. To produce food grade $CO_2$ from a $CO_2$ lean stream a two stage process was used with the first stage being a $CO_2$ vacuum swing adsorption (hereinafter "VSA") or PSA process. In the first PSA or VSA stage, a $CO_2$ lean stream containing <50% $CO_2$ was upgraded to a high concentration $CO_2$ mixture (>90% $CO_2$). This high concentration $CO_2$ mixture was then sent to a second stage which was a standard $CO_2$ liquefaction plant. Therefore, a food grade $CO_2$ product was produced. On the other hand, the $CO_2$ VSA/PSA process normally generates another $CO_2$ lean product. Typically this $CO_2$ lean product contains over 35% $H_2$, 20% $CH_4$ and 15% CO with a balance of $CO_2$ which was sent to the reformer as fuel in current designs.

There exists a need to provide a process for recovering high purity gaseous hydrogen and high purity gaseous carbon dioxide from the gas stream produced using steam hydrocarbon reforming, especially steam methane reforming. There also exists a need for a process for treating the waste gas stream obtained from a $H_2$ PSA unit under optimum conditions in order to allow for the recovery of a high quantity of high purity gaseous carbon dioxide.

SUMMARY OF THE INVENTION

The present invention relates to various processes for recovering high purity gaseous hydrogen and high purity gaseous carbon dioxide from the gas stream produced using steam hydrocarbon reforming, especially steam methane reforming, utilizing a pressure swing adsorption unit in combination with either a $CO_2$ pressure swing adsorption unit in combination with a membrane separation unit or a $CO_2$ pressure vacuum swing adsorption unit in combination with a membrane separation unit. The present invention further relates to a process for optimizing the recovery of carbon dioxide from waste gas streams produced during the hydrogen purification step of a steam hydrocarbon reforming/water gas shift reactor/$H_2$ pressure swing adsorption unit utilizing either a $CO_2$ pressure swing adsorption unit in combination with a membrane separation unit or a $CO_2$ pressure vacuum swing adsorption unit in combination with a membrane separation unit. The present invention even further relates to the apparatus necessary to carry out the various processes of the present invention.

DETAILED DESCRIPTION OF THE INVENTION

By integrating either a $CO_2$ pressure swing adsorption (hereinafter "$CO_2$ PSA") unit in combination with a membrane separation unit or a $CO_2$ pressure vacuum swing adsorption (hereinafter "$CO_2$ PVSA") unit in combination with a membrane separation unit with a SHR unit, a water gas shift (hereinafter "WGS") unit, and a $H_2$ PSA unit, it is possible to arrive at processes for producing not only high purity hydrogen gas but also in the same scheme high purity carbon dioxide gas thereby overcoming many of the disadvantages of prior art $H_2/CO_2$ recovery processes. The proposed integrated processes of the present invention involve different embodiments which include: 1) the use of a $CO_2$ PSA unit and a membrane separation unit in conjunction with a SHR unit, a WGS unit, and a $H_2$ PSA unit or 2) the use of a $CO_2$ PVSA unit and membrane separation unit in conjunction with a SHR unit, a WGS unit, and a H, PSA unit in order to recover additional $CO_2$ that would normally be used for other purposes such as the makeup fuel for the SHR unit of the SHR unit/WGS reactor/$H_2$ PSA unit scheme.

One advantage of the present invention is that these process configurations are suitable for the recovery of $CO_2$ from mixtures containing not only high levels of $CO_2$ but also low levels of $CO_2$ (also referred to herein as "lean" $CO_2$ mixtures). More specifically, the present processes are proposed for use in areas where conventional $CO_2$ sources are not available for the merchant $CO_2$ market. As used herein, the phrase "merchant $CO_2$ market" refers to the $CO_2$ market which involves the removal $CO_2$ from gas streams and the subsequent sale/use of this purified $CO_2$. The various process embodiments of the present invention not only deliver merchant $CO_2$ product economically at a small scale but may also be potentially useful on a large scale. The main benefit of using these integrated processes is that they allow for improved recovery of high purity $CO_2$. In addition, in certain embodiments, depending upon the conditions utilized and the feed gas streams utilized, it may be possible to increase overall $H_2$ recovery and to enhance plant operation, flexibility, and reliability.

Figure 1:
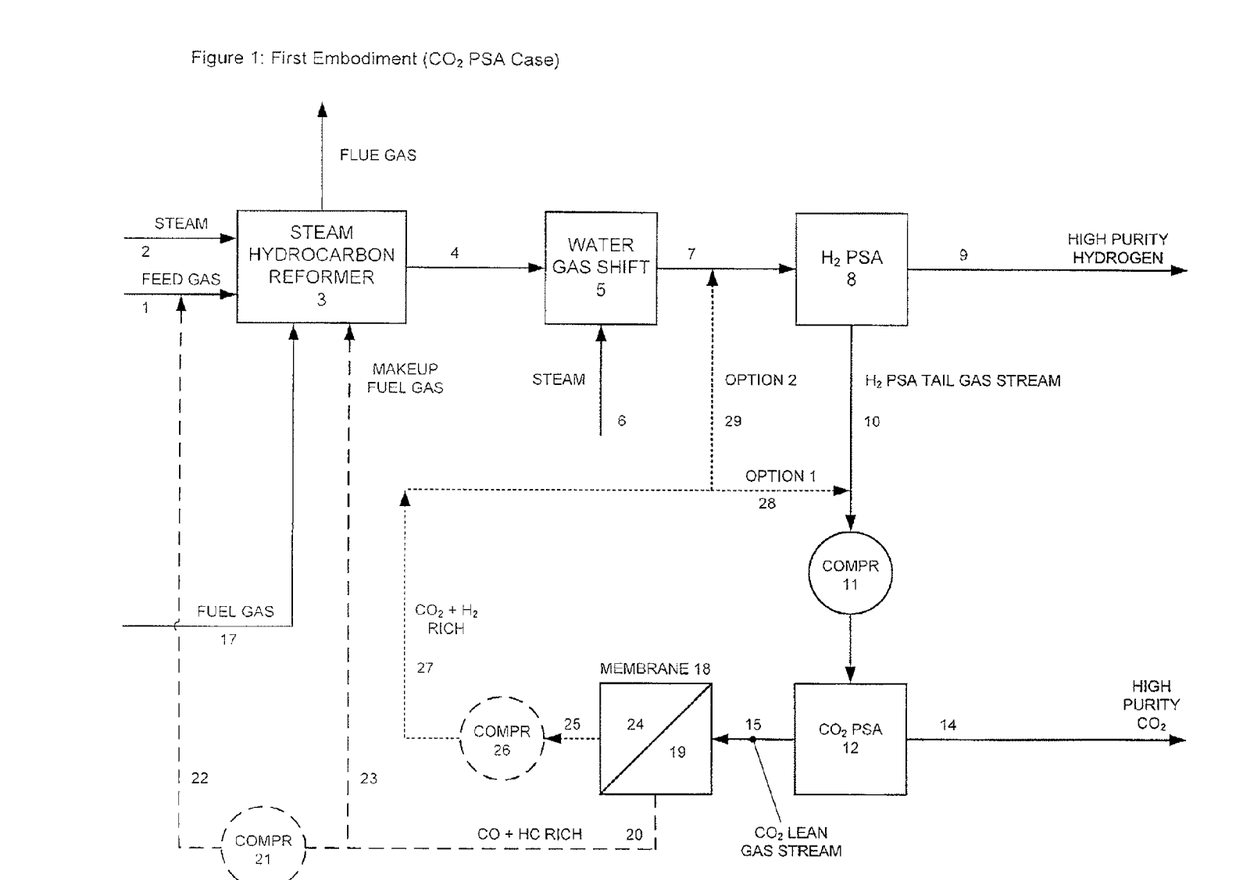
FIG. 1 provides a schematic of one embodiment of the present invention which includes a carbon dioxide pressure swing adsorption unit in combination with a membrane separation unit.
Figure 2:
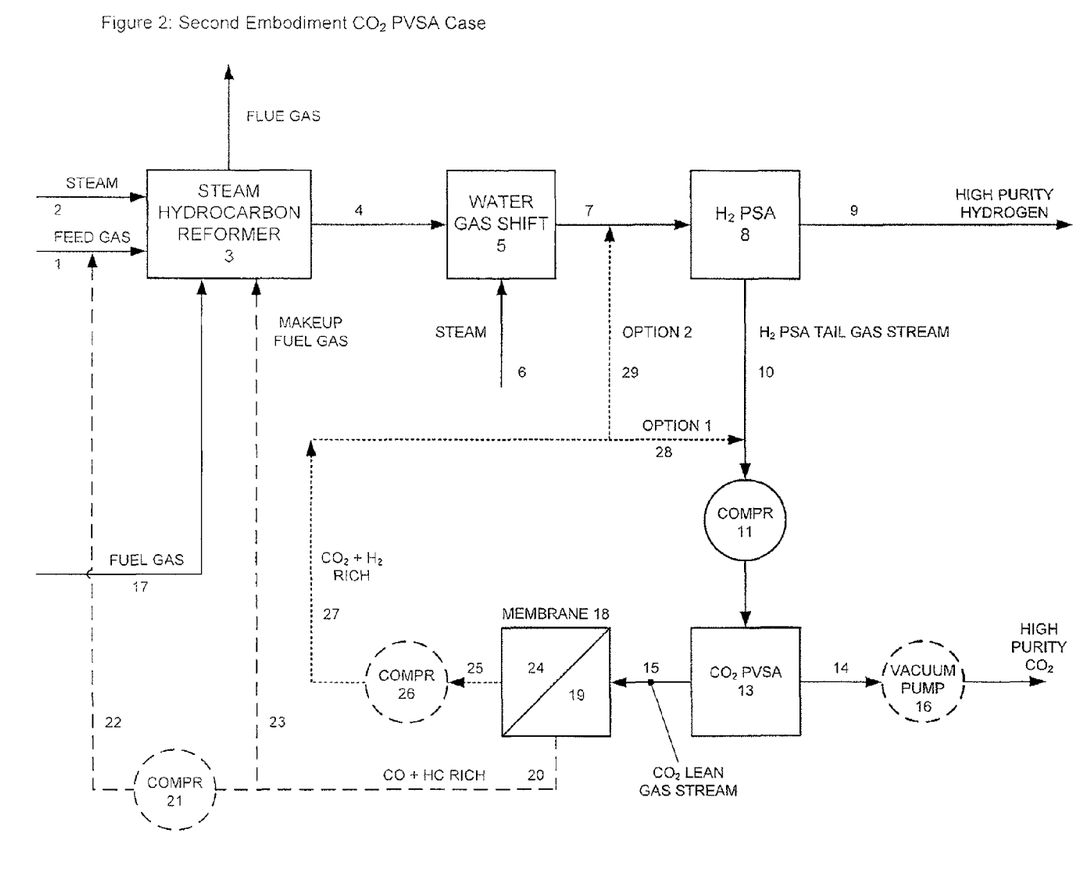
FIG. 2 provides a schematic of an alternative embodiment of the present invention which includes a carbon dioxide pressure vacuum swing adsorption unit in combination with a membrane separation unit.

As can be seen from the Figures of the present invention, the overall objective of the processes of the present invention involve recovering high purity gaseous hydrogen and high purity gaseous carbon dioxide. As shown in FIG. 1 and FIG. 2, the first stage of each of these processes involves the introduction of one or more hydrocarbon streams (also referred to herein as one or more hydrocarbon feed gases) via line 1 along with steam 2 into a SHR unit 3. Prior to being introduced into the actual reformer of the SHR unit 3, the one or more hydrocarbon streams 1 are typically compressed (not shown), e.g. to about 200 to 600 psig, and combined with the high pressure steam 2, which is at about 700 psig, before entering the SHR unit 3. The SHR unit 3 conventionally contains tubes (not shown) packed with catalyst (typically a nickel catalyst) through which the steam 2/hydrocarbon stream 1 mixture passes. An elevated temperature of about 860° C. is typically maintained to drive the reaction which is endothermic. As used herein, the phrase "steam hydrocarbon reformer unit" or "SHR unit" refers not only to the reformer, but also to all of the additional components that typically are considered to make up a steam hydrocarbon reformer, including, but not limited to, one or more components selected from heat exchangers, pre-reformer units, the reformer, tubes with one or more types of catalyst, etc. Note that a steam methane reformer unit (also referred to herein as a SMR unit) is considered to be a specific type of SHR unit and is generally the preferred type of SHR unit. The reaction product from the SHR unit (hereinafter "SHR product stream") is principally a hydrogen rich effluent of which the major components include hydrogen, carbon monoxide, methane, water and carbon dioxide in proportions close to equilibrium amounts at the elevated temperature and pressure. In certain embodiments of the present invention where there is a high amount of carbon monoxide in the SHR product stream (which depends upon the actual composition of the initial hydrocarbon streams injected into the SHR unity the scheme may optionally contain a water gas shift (also referred to herein as "WGS") reactor 5 which functions to form additional hydrogen and carbon dioxide by further reacting or treating the SHR product stream with additional steam in order to obtain a water gas shift effluent. In the embodiment where the WGS reactor 5 is included, the SHR product stream is then introduced via line 4 into the WGS reactor 5 (which can contain a variety of stages or one stage; embodiment with various stages not shown) along with steam which is introduced via line 6 to form additional hydrogen and carbon dioxide. The WGS reactor 5 converts the carbon monoxide to carbon dioxide with the liberation of additional hydrogen by reaction at high temperature in the presence of the additional steam. The WGS reactor utilized can be any WGS reactor known by those skilled in the art. In addition, the combination of a SHR unit 3 and a WGS reactor 5 is also well known to those of ordinary skill in the art.

The SHR reaction product (in the case where there is no water gas shift reactor) or the water gas shift reaction product (hereinafter "WGS reaction product) is then introduced into a $H_2$ PSA unit 8 via line 7 in order to produce high purity hydrogen. Prior to introduction into the $H_2$ PSA 8, the WGS reaction product (or SHR reaction product when there is no WGS reactor) will typically be cooled down to less than 50° C. and a pressure in the range of 200 to 600 psig. The cooling clown step is typically accomplished via a heat exchanger (not shown). The $H_2$ PSA unit 8 utilized can be any $H_2$ PSA unit known in the art and can comprise anywhere from two to twelve adsorption beds (not shown) although more adsorption beds may be utilized. During the process of $H_2$ production, each of the adsorption beds will individually undergo a cycle that generally comprises: a) pressurization with pure hydrogen product, b) constant feed and hydrogen product release; c) pressure equalization to transfer high pressure hydrogen-rich void gas to another bed at low pressure, the other bed being about to commence product pressurization; d) depressurization to slightly above atmospheric pressure; e) purge using product hydrogen; and f) pressure equalization with another bed at higher pressure to accept hydrogen-rich void gas. Note that with regard to the multiple beds, these beds are typically staggered with regard to their point in the process cycle noted (at different steps with regard to one another) in order to allow continuous uninterrupted processing. The type of adsorbents utilized in the adsorbent beds may be any type of adsorbent that is known in the art for such $H_2$ PSA beds. Preferably, the adsorbents used in the $H_2$ PSA 8 include, but are not limited to, activated alumina, activated carbon, zeolite and combinations thereof. As a result of this process, two separate gas streams are obtained—one that is a gaseous high purity hydrogen stream that is withdrawn via line 9 where it is passed on for further use and/or storage and the other gas stream which is often referred to as a $H_2$ PSA tail gas which is withdrawn via line 10 after desorption of a bed and is then subjected to further processing. The PSA tail gas withdrawn from the adsorption beds of the $H_2$ PSA unit 8 during the depressurization and purge steps noted above generally comprises carbon dioxide, methane and carbon monoxide and any remaining hydrogen. The adsorption beds may be depressurized and purged using any number of manners that are readily known to those skilled in the art. The combination of a $H_2$ PSA unit 8 with a SHR unit 3 and an optional WGS reactor 5 is well known to those of ordinary skill in the art and is depicted in each of the embodiments described hereinafter. With regard to the embodiments described hereinafter, the process will be described with reference to a SHR unit 3, a WGS reactor 5, and a $H_2$ PSA unit. However, those skilled in the art will recognize that the same description is applicable for embodiments in which the WGS reactor 5 is not present.

The next step in the process involves the removal of $CO_2$ from the $H_2$ PSA tail gas stream, more specifically for the removal of $CO_2$ from $H_2$ PSA tail gas streams produced as a result of the SHR/WGS/$H_2$ PSA 3/5/8 process. A variety of alternatives are available for the removal of $CO_2$ from this $H_2$ PSA tail gas with each of these comprising the SHR-WGS-$H_2$ PSA scheme described hereinbefore. The present embodiments present alternatives to the prior art which allow for the removal of $CO_2$ from the $H_2$ PSA tail gas stream which would normally be used as makeup fuel for the SHR unit.

As noted above, in the standard SHR/WGS/$H_2$ PSA 3/5/8 scheme, by treating the gas stream that is produced by processing through the SHR unit 3 and WGS reactor 5, it is possible to obtain a gas stream that is rich in hydrogen. As previously noted, this hydrogen rich gas stream is then injected into the $H_2$ PSA unit 8 via line 7 under standard PSA conditions (including standard temperatures and pressures) with the result that a high purity gas stream comprising greater than about 99% hydrogen, preferably in the area of 99.9% hydrogen is obtained. As a result of subjecting this hydrogen rich gas stream to the $H_2$ PSA process, a waste stream that is referred to as a $H_2$ PSA tail gas stream is also obtained. During the $H_2$ PSA process, the high purity gas stream passes through the various beds and is withdrawn while the heavier components are adsorbed by the adsorbents in the beds. The resulting $H_2$ PSA tail gas stream is withdrawn from the $H_2$ PSA unit via line 10 after the pressure of the adsorbent bed is decreased (depressurization or desorption) thereby releasing the adsorbed components. The resulting $H_2$ PSA tail gas is then purged from the bed and in the present invention passed along for further treatment. The $H_2$ PSA tail gas stream typically comprises methane, hydrogen, carbon monoxide, carbon dioxide and water with the amount of each being present typically depending upon the actual feed gas utilized for the SHR/WGS/$H_2$ PSA 3/5/8 processes. While not wishing to be restricted by reciting actual ranges of components, typically the $H_2$ PSA tail gas comprises from about 30 to about 60% $CO_2$, more typically from about 40 to about 50% $CO_2$. In the past, regardless of the composition, this $H_2$ PSA tail gas stream was typically used as a makeup fuel to be added back to the SHR unit 3 along with natural gas. As a result, there was a loss of valuable $CO_2$.

In the present invention as shown in FIG. 1 and FIG. 2, rather than use the $H_2$ PSA tail gas stream as a makeup fuel, the $H_2$ PSA tail gas stream is instead treated in order to remove the valuable $CO_2$ present as a high purity $CO_2$ stream. This treatment of the $H_2$ PSA tail gas stream is carried out in the first embodiment of the present invention using a $CO_2$ PSA unit 12 in combination with a membrane separation unit 18. As used herein, the phrase "$CO_2$ PSA unit" refers to a standard pressure swing adsorption unit in which the various adsorbent beds utilized include an adsorbent that is specific for $CO_2$ in order to allow for the selection and subsequent removal of $CO_2$ from the gas stream being introduced into the $CO_2$ PSA unit 12. More specifically, the PSA unit utilized as the $CO_2$ PSA unit 12 can include any standard PSA unit such as the PSA unit utilized for hydrogen recovery as discussed hereinbefore. The difference between the $CO_2$ PSA unit 12 and the $H_2$ PSA unit 8 is that in the case of the $CO_2$ PSA unit 12, the adsorbents are specifically selective for $CO_2$ whereas in the case of the $H_2$ PSA unit 8, the adsorbents are less specific and are selective for all components with the exception of hydrogen since in the $H_2$ PSA unit 8, the objective is to produce a high purity hydrogen stream. Accordingly, this $CO_2$ PSA unit 12 can contain the same hardware as the $H_2$ PSA unit 8, including from two to twelve or more adsorption beds. Those skilled in the art will recognize that such PSA units are well known and include a variety of schematic variations such as varying numbers of beds and the use or a variety of different types of adsorbents.

In the second embodiment of the present invention, this treatment is carried out using a $CO_2$ PVSA unit in combination with a membrane separation unit. As used herein with regard to the present invention, the term "PVSA" refers to a non-cryogenic gas separation technology which utilizes the use of adsorbents for the removal of certain gases from a gas mixture and vacuum for the removal of the certain gases from the adsorbents. Furthermore, as used herein, the phrase "$CO_2$ PVSA unit" refers to a pressure vacuum swing unit in which vacuum is used along with an adsorbent that is specific to $CO_2$ in order to select for $CO_2$ removal from a gas stream. Those of ordinary skill in the art will recognize that while it is critical that the PVSA unit be utilized in the process of the present invention, the actual configuration of the PVSA unit is not necessarily critical provided that the PVSA unit comprises two or more static beds of the zeolite adsorbent (also referred to as zeolite beds), preferably from two to four static beds. Accordingly, any PVSA unit known in the art which includes at least one or more zeolites as adsorbent in at least two beds may be used for the $CO_2$ PVSA unit in the process of the present invention.

In the first embodiment of the present invention, PSA tail gas from the $H_2$ PSA unit 8, which is typically at a low pressure (less than 10 psig), is first compressed in a compressor 11 to a desired pressure before being fed along line 10 into a $CO_2$ PSA unit 12. The desired pressure utilized will typically be in the range of from about 20 psig to about 200 psig, preferably from about 20 psig to about 150 psig, even more preferably from about 50 psig to about 120 psig. As an alternative, this embodiment may also include a dryer system (not shown) that may be installed just after the compressor 11 along line 10 to remove moisture from the $H_2$ PSA tail gas. However, the installation of a dryer system between the compressor 11 that receives the $H_2$ PSA tail gas and the $CO_2$ PSA unit 12 is not critical as the downstream use of the $CO_2$ typically will include a means to remove the moisture from the $CO_2$.

The adsorbent used in beds of the $CO_2$ PSA unit 12 will be adsorbents selected from activated carbons, silica gels, one or more zeolites or any combination thereof. In this particular embodiment, the compressed $H_2$ PSA tail gas is passed from the compressor 11 into the $CO_2$ PSA unit 12 where the $CO_2$ in the gas mixture will be adsorbed onto the adsorbents in the one or more beds of the $CO_2$ PSA unit 12. The remaining components pass over the one or more beds and exit the $CO_2$ PSA unit 12 via line 15 as a $CO_2$ lean high pressure gas stream. The $CO_2$ lean high pressure gas stream obtained contains hydrogen, carbon dioxide, carbon monoxide and methane. The $CO_2$ that is adsorbed onto the adsorbents of the one or more beds of the $CO_2$ PSA unit 12 is removed from the adsorbent as an enriched $CO_2$ stream by desorption of the beds in a manner as described hereinbefore with regard to the $H_2$ PSA unit 8. Desorption is accomplished by depressurizing the one or more beds to ambient pressure thereby resulting in an enriched desorption $CO_2$ gas stream. This enriched desorption $CO_2$ gas stream, which contains over 90% $CO_2$, is passed on via line 14 to be further processed, for example the enriched desorption $CO_2$ stream is sent to a liquefaction plant (not shown) for further purification.

The $CO_2$ lean high pressure gas stream that is obtained from the $CO_2$ PSA unit 12 is fed via line 15 to a membrane separation unit 18 which comprises multiple modules (not shown) that contain membranes that are selective for $CO_2$ and $H_2$ with the number of modules being used being determined by the size of the recovery plant. While any membrane that is selective for $CO_2$ and $H_2$ may be used, such as a PI-C or G5 types of membranes (commercially available from MEDAL, a division of Air Liquide Advanced Technologies U.S. LLC) are considered to be particularly useful. The actual configuration of the membrane separation unit is such that it receives the $CO_2$ lean gas stream and passes this stream through a module which includes the membranes. With regard to the membrane separation unit 18, through the use of pressure differentials and specific membranes, it is possible to separate components in the lean $CO_2$ high pressure gas stream. The membrane operating temperature is not critical, although $CO_2$ selectivity is typically increased at low temperature. As used herein, the phrase "low temperature" as it relates to membrane operating temperature generally comprises a temperature range from about 10° C. to about 50° C., although in certain instances a broader range may be utilized. More specifically, through the use of pressure differentials and specific membranes, it is possible to separate the $CO_2$ lean gas stream into two streams thereby obtaining a first membrane stream from the membrane residue side 19 that contains a substantial amount of hydrocarbons (especially $CH_4$) and CO, which, dependent upon the ratio of hydrocarbons and CO in the stream, can be recycled via lines 20 and 23 to the SHR unit 3 as a makeup fuel or alternatively compressed in second compressor 21 and recycled via lines 20 and 22 to the SHR unit 3 as a feed stream to be added with the hydrocarbon feed stream online 1. In contrast, the low pressure stream from the membrane permeate side 24 will normally be rich in $H_2$ and $CO_2$ which will comprise the second membrane stream. This $H_2$ and $CO_2$ rich second membrane stream can be either recycled as a feed to the $CO_2$ PSA unit 12 by adding it to the $H_2$ PSA tail gas stream of line 10 via lines 25, 27 and 28 or optionally re-compressed to the feed stream 7 that will be fed into the $H_2$ PSA unit 8 via lines 25, 27 and 29. Accordingly, with the present embodiment, the proposed process converts a maximum amount of $CH_4$ to $H_2$ and CO in addition to a food grade $CO_2$ product.

The second embodiment of the present invention as depicted in FIG. 2 is the same as the first embodiment of the present invention with the exception that the $CO_2$ PSA unit 12 is replaced by a $CO_2$ PVSA unit 13. The difference between $CO_2$ PSA 12 and $CO_2$ PVSA 13 is that the adsorbed $CO_2$ is withdrawn from the adsorption bed with the aid of a vacuum pump 16 in the $CO_2$ PVSA process, instead of using only depressurization of the bed to ambient pressure in the $CO_2$ PSA process. In this present embodiment, the $H_2$ PSA tail gas from the $H_2$ PSA unit 8 is also compressed in a compressor 11 to a desired pressure before being fed along line 10 into a $CO_2$ PVSA unit 13. As in the first embodiment, the desired pressure utilized will typically be in the range of from about 20 psig to about 200 psig, preferably from about 30 psig to about 150 psig, even more preferably from about 50 psig to about 120 psig. As with the first embodiment, this embodiment may also optionally include a dryer system (not shown) that may be installed just after the compressor 11 along line 10 to remove moisture from the $H_2$ PSA tail gas.

The adsorbent used in the $CO_2$ PVSA unit 13 will be adsorbents selected from activated carbons, silica gels, one or more zeolites or any combination thereof. In this particular embodiment, the compressed $H_2$ PSA tail gas is passed from the compressor 11 into the $CO_2$ PVSA unit 13 where the $CO_2$ in the gas mixture will be adsorbed onto the adsorbents in the one or more beds of the $CO_2$ PVSA unit 13. The remaining components pass over the one or more beds and exit the $CO_2$ PVSA unit 13 via line 15 as a $CO_2$ lean high pressure gas stream. The $CO_2$ lean high pressure gas stream obtained contains hydrogen, carbon dioxide, carbon monoxide and methane. The $CO_2$ that is adsorbed onto the adsorbents of the one or more beds of the $CO_2$ PVSA unit 13 is removed from the adsorbent as an enriched $CO_2$ stream by using a vacuum pump in order to produce a high purity gaseous $CO_2$ gas stream. This $CO_2$ gas stream, which contains over 90% $CO_2$, is passed on via line 14 with the aid of a vacuum pump 16 to be further processed, for example the enriched desorption $CO_2$ stream is sent to a liquefaction plant (not shown) for further purification.

The $CO_2$ lean high pressure gas stream that is obtained from the $CO_2$ PVSA unit 13 is then fed via line 15 to the membrane separation unit 18 in the same manner as described with regard to the first embodiment.

The present invention further comprises the various systems discussed hereinbefore with regard to the noted processes.

ELEMENTS

1 feed gas (hydrocarbon stream)
2 steam injection to steam hydrocarbon reformer
3 steam hydrocarbon reformer
4 line from steam hydrocarbon reformer to water gas shift
5 water gas shift
6 steam injection to water gas shift
7 line from water gas shift to hydrogen pressure swing adsorption unit
8 hydrogen pressure swing adsorption unit
9 line for removal of high purity hydrogen
10 line for removal of $H_2$ PSA tail gas
11 compressor
12 carbon dioxide pressure swing adsorption unit
13 carbon dioxide pressure vacuum swing adsorption unit
14 line from which high purity carbon dioxide stream exits the carbon dioxide pressure swing adsorption unit or the carbon dioxide pressure vacuum swing adsorption unit
15 line from which lean gas stream exits the carbon dioxide pressure swing adsorption unit or the carbon dioxide pressure vacuum swing adsorption unit
16 vacuum pump
17 fuel gas line for steam hydrocarbon reformer unit
18 membrane separation unit
19 membrane residue side
20 line from which first membrane stream exits membrane separation unit
21 second compressor
22 line where first membrane stream is recycled to the feed gas for the steam hydrocarbon reformer unit
23 line where first membrane stream is recycled directly to the steam hydrocarbon reformer unit 24 membrane permeate side
25 line from which second membrane stream exits membrane separation unit
26 third compressor
27 line where compressed second membrane stream exits third compressor 27
28 line where second membrane stream is recycled to the feed stream to be fed into the hydrogen pressure swing adsorption unit
29 line where second membrane stream is recycled to the hydrogen pressure swing adsorption tail gas stream to be fed into either the carbon dioxide pressure swing adsorption unit or the carbon dioxide pressure vacuum swing adsorption unit

What is claimed is:

1. A process for recovering high purity gaseous hydrogen and high purity gaseous carbon dioxide comprising:
  a) generating a hydrogen rich effluent that also contains carbon monoxide, carbon dioxide, methane and water from one or more hydrocarbon feeds and in a steam hydrocarbon reformer;
  b) treating the hydrogen rich effluent in a water gas shift reactor in order to further enrich the hydrogen rich effluent and also increase the carbon dioxide content in the hydrogen rich effluent thereby obtaining a water gas shift effluent;
  c) introducing the water gas shift effluent into a hydrogen pressure swing adsorption unit having two or more beds that contain one or more adsorbents that allow for the recovery of a high purity gaseous hydrogen stream and the adsorption of carbon dioxide, carbon monoxide, methane, water and the remaining hydrogen onto the adsorbents in the two or more beds;
  d) withdrawing the high purity gaseous hydrogen from the hydrogen pressure swing adsorption unit and passing this stream on for further use;
  e) depressurizing the two or more beds that contain the adsorbent in order to release the carbon dioxide, carbon monoxide, methane, water and the remaining hydrogen adsorbed thereto and produce a hydrogen pressure swing adsorption tail gas;
  f) withdrawing the hydrogen pressure swing adsorption tail gas from the hydrogen pressure swing adsorption unit and introducing the hydrogen pressure swing adsorption tail gas into a compressor in order to compress the hydrogen pressure swing adsorption tail gas;
  g) introducing the compressed hydrogen pressure swing adsorption tail gas into a carbon dioxide pressure swing adsorption unit that contains one or more beds of an adsorbent selected from activated carbon, silica gels, one or more zeolites or any combination thereof thereby allowing for the recovery of a secondary high purity gaseous carbon dioxide stream by adsorption of the carbon dioxide to the adsorbent and a secondary carbon dioxide lean gas stream;
  h) allowing the secondary carbon dioxide lean gas stream to pass from the carbon dioxide pressure swing adsorption unit into a membrane separation unit that includes one or more modules, each module having one or more membranes that are highly selective for hydrogen and carbon dioxide, said membranes having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane;
  i) recycling the first membrane stream to the feed gas of the steam hydrocarbon reformer unit with the aid of a second compressor or to the steam hydrocarbon reformer as makeup fuel;
  j) optionally recompressing the second membrane stream in a third compressor and recycling this compressed second membrane stream to the water gas shift effluent to be introduced into the hydrogen pressure swing adsorption unit or passing the second membrane stream to the hydrogen pressure swing adsorption tail gas to be compressed before being injected into the carbon dioxide pressure swing adsorption unit; and
  k) removing the carbon dioxide that is adsorbed onto the one or more beds of the carbon dioxide pressure swing adsorption unit by vacuum decompressing the one or more beds.

2. A process for treating a hydrogen pressure swing adsorption tail gas stream that contains hydrogen, carbon monoxide, carbon dioxide, methane and water in order to recover high purity carbon dioxide from the tail gas stream, said process comprising the steps of:
  a) introducing the hydrogen pressure swing adsorption tail gas into a compressor in order to compress the tail gas;
  b) introducing the compressed hydrogen pressure swing adsorption tail gas into a carbon dioxide pressure swing adsorption unit that contains one or more beds of an adsorbent selected from activated carbon, silica gels, one or more zeolites or any combination thereof thereby allowing for the recovery of a secondary high purity gaseous carbon dioxide stream by adsorption of the carbon dioxide to the adsorbent and a secondary carbon dioxide lean gas stream;
  c) allowing the secondary carbon dioxide lean gas stream to pass from the carbon dioxide pressure swing adsorption unit to a membrane separation unit that includes a membrane that is highly selective for hydrogen and carbon dioxide, said membrane having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane;
  d) recompressing the first membrane stream and recycling the compressed first membrane stream as feed gas for the steam hydrocarbon reformer or as makeup fuel for the steam hydrocarbon reformer;
  e) optionally recompressing the second membrane stream in a third compressor and recycling this compressed second membrane stream to the water gas shift effluent to be introduced into the hydrogen pressure swing adsorption unit or passing the second membrane stream to the hydrogen pressure swing adsorption tail gas to be compressed before being injected into the carbon dioxide pressure swing adsorption unit; and
  f) removing the carbon dioxide that is adsorbed onto the one or more beds of the carbon dioxide pressure swing adsorption unit by decompressing the one or more beds in order to produce a high purity gaseous carbon dioxide stream.

3. A process for recovering high purity gaseous hydrogen and high purity gaseous carbon dioxide comprising:
  a) generating a hydrogen rich effluent that also contains carbon monoxide, carbon dioxide, methane and water from one or more hydrocarbon feeds and in a steam hydrocarbon reformer;

b) treating the hydrogen rich effluent in a water gas shift reactor in order to further enrich the hydrogen rich effluent and also increase the carbon dioxide content in the hydrogen rich effluent thereby obtaining a water shift effluent;

c) introducing the water shift effluent into a hydrogen pressure swing adsorption unit having two or more beds that contain one or more adsorbents that allow for the recovery of a high purity gaseous hydrogen stream and the adsorption of carbon dioxide, carbon monoxide, methane, water and the remaining hydrogen onto the adsorbents in the two or more beds;

d) withdrawing the high purity gaseous hydrogen from the hydrogen pressure swing adsorption unit and passing this stream on for further use;

e) depressurizing the two or more beds that contain the adsorbent in order to release the carbon dioxide, carbon monoxide, methane, water and the remaining hydrogen adsorbed thereto and produce a hydrogen pressure swing adsorption tail gas;

f) withdrawing the hydrogen pressure swing adsorption tail gas from the hydrogen pressure swing adsorption unit and introducing the hydrogen pressure swing adsorption tail gas into a compressor in order to compress the tail gas;

g) introducing the compressed hydrogen pressure swing adsorption tail gas into a carbon dioxide pressure vacuum swing adsorption unit that contains one or more beds of an adsorbent selected from activated carbon, silica gels, one or more zeolites or any combination thereof thereby allowing for the recovery of a secondary high purity gaseous carbon dioxide stream by adsorption of the carbon dioxide to the adsorbent and a secondary carbon dioxide lean gas stream;

h) allowing the secondary carbon dioxide lean gas stream to pass from the carbon dioxide pressure vacuum swing adsorption unit into to a membrane separation unit that includes a membrane that is highly selective for hydrogen and carbon dioxide, said membrane having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane;

i) recompressing the first membrane stream and recycling the compressed first membrane stream to the feed gas of the steam hydrocarbon reformer unit with the aid of a second compressor or to the steam hydrocarbon reformer as makeup fuel;

j) optionally recompressing the second membrane stream in a third compressor and recycling this compressed second membrane stream to the water gas shift effluent to be introduced into the hydrogen pressure swing adsorption unit or passing the second membrane stream to the hydrogen pressure swing adsorption tail gas to be compressed before being injected into the carbon dioxide pressure vacuum swing adsorption unit; and k) removing the carbon dioxide that is adsorbed onto the one or more beds of the carbon dioxide pressure vacuum swing adsorption unit by using a vacuum pump in order to produce a high purity gaseous carbon dioxide stream.

4. A process for treating a hydrogen pressure swing adsorption tail gas stream that contains hydrogen, carbon monoxide, carbon dioxide, methane and water in order to recover high purity carbon dioxide from the tail gas stream, said process comprising the steps of:

a) introducing the hydrogen pressure swing adsorption tail gas into a compressor in order to compress the tail gas;

b) introducing the compressed hydrogen pressure swing adsorption tail gas into a carbon dioxide pressure vacuum swing adsorption unit that contains one or more beds of an adsorbent selected from activated carbon, silica gels, one or more zeolites or any combination thereof thereby allowing for the recovery of a secondary high purity gaseous carbon dioxide stream by adsorption of the carbon dioxide to the adsorbent and a secondary carbon dioxide lean gas stream;

c) allowing the secondary carbon dioxide lean gas stream to pass from the carbon dioxide pressure vacuum swing adsorption unit to a membrane separation unit that includes a membrane that is highly selective for hydrogen and carbon dioxide, said membrane having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane;

d) recompressing the first membrane stream in a second compressor and recycling it for further use as a feed gas for the steam hydrocarbon reformer or makeup fuel for the steam hydrocarbon reformer;

e) optionally recompressing the second membrane stream in a third compressor and recycling this compressed second membrane stream to the water gas shift effluent to be introduced into the hydrogen pressure swing adsorption unit or passing the second membrane stream to the hydrogen pressure swing adsorption tail gas to be compressed before being injected into the carbon dioxide pressure vacuum swing adsorption unit; and k) removing the carbon dioxide that is adsorbed onto the one or more beds of the carbon dioxide pressure vacuum swing adsorption unit by using a vacuum pump in order to produce a high purity gaseous carbon dioxide stream.

5. A system for recovering high purity gaseous hydrogen and high purity gaseous carbon dioxide comprising:

a) a steam hydrocarbon reformer that generates a hydrogen rich effluent that also contains carbon monoxide, carbon dioxide, methane and water from one or more hydrocarbon feed gases;

b) a water gas shift reactor for treating the hydrogen rich effluent to convert the carbon monoxide present in the hydrogen rich effluent to carbon dioxide to obtain a water shift effluent and a means for passing the hydrogen rich effluent from the steam hydrogen carbon reformer to the water gas shift reactor;

c) a hydrogen pressure swing adsorption unit having two or more beds that contain one or more adsorbents that allow for the recovery of a high purity gaseous hydrogen stream and a hydrogen pressure swing adsorption tail gas that contains the carbon dioxide, carbon monoxide, methane, water and the remaining hydrogen from the water shift effluent of the water gas shift reactor and a means for passing the water shift effluent from the water gas shift reactor to the hydrogen pressure swing adsorption unit;

d) a first compressor for compressing the hydrogen pressure swing adsorption tail gas from the hydrogen pressure swing adsorption unit to a pressure from about 20 psig to about 60 psig and a means for passing the tail gas from the hydrogen pressure swing adsorption unit to the compressor;

e) a carbon dioxide pressure vacuum swing adsorption unit that contains two or more beds of an adsorbent selected from activated carbon, silica gels, one or more zeolites or any combination thereof thereby allowing for the recovery of a secondary high purity gaseous carbon dioxide by adsorption of the carbon dioxide to the adsorbent and a secondary carbon dioxide lean gas stream;

f) a membrane separation unit that includes a membrane that is highly selective for hydrogen and carbon dioxide, said membrane having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane and a means of passing the secondary carbon dioxide lean gas stream to pass from the carbon dioxide pressure vacuum swing adsorption unit to the membrane separation unit;

g) a second compressor for recompressing the first membrane stream and a means to recycle the compressed first membrane stream to the steam hydrocarbon reformer unit as a feed stream or to the steam hydrocarbon reformer unit as a make up fuel;

h) a third compressor for recompressing the second membrane stream and means for either recycling this compressed second membrane stream to the steam hydrocarbon reformer unit to be added to the water gas shift effluent to be introduced into the hydrogen pressure swing adsorption unit or to be added to the hydrogen pressure swing adsorption tail gas stream to be introduced into carbon dioxide pressure vacuum swing adsorption unit; and i) a means to vacuum decompress the two or more beds to remove the carbon dioxide that is adsorbed onto the one or more beds of the carbon dioxide pressure vacuum swing adsorption unit and pass this carbon dioxide on for further use.

6. A system for recovering high purity gaseous hydrogen and high purity gaseous carbon dioxide comprising:

a) a steam hydrocarbon reformer that generates a hydrogen rich effluent that also contains carbon monoxide, carbon dioxide, methane and water from one or more hydrocarbon feed gases;

b) a water gas shift reactor for treating the hydrogen rich effluent to convert the carbon monoxide present in the hydrogen rich effluent to carbon dioxide to obtain a water shift effluent and a means for passing the hydrogen rich effluent from the steam hydrogen carbon reformer to the water gas shift reactor;

c) a hydrogen pressure swing adsorption unit having two or more beds that contain one or more adsorbents that allow for the recovery of a high purity gaseous hydrogen stream and a hydrogen pressure swing adsorption tail gas that contains the carbon dioxide, carbon monoxide, methane, water and the remaining hydrogen from the water shift effluent of the water gas shift reactor and a means for passing the water shift effluent from the water gas shift reactor to the hydrogen pressure swing adsorption unit;

d) a first compressor for compressing the hydrogen pressure swing adsorption tail gas from the hydrogen pressure swing adsorption unit to a pressure from about 20 psig to about 60 psig and a means for passing the tail gas from the hydrogen pressure swing adsorption unit to the compressor;

e) a carbon dioxide pressure swing adsorption unit that contains two or more beds of an adsorbent selected from activated carbon, silica gels, one or more zeolites or any combination thereof thereby allowing for the recovery of a secondary high purity gaseous carbon dioxide by adsorption of the carbon dioxide to the adsorbent and a secondary carbon dioxide lean gas stream;

f) a membrane separation unit that includes a membrane that is highly selective for hydrogen and carbon dioxide, said membrane having a residue side and a permeate side, the membrane allowing for the retention of methane and carbon monoxide to form a first membrane stream on the residue side of the membrane and the passing of carbon dioxide and hydrogen to the permeate side to form a second membrane stream on the permeate side of the membrane and a means of passing the secondary carbon dioxide lean gas stream to pass from the carbon dioxide pressure vacuum swing adsorption unit to the membrane separation unit;

g) a second compressor for recompressing the first membrane stream and a means to recycle the compressed first membrane stream to the steam hydrocarbon reformer unit as a feed stream or to the steam hydrocarbon reformer unit as a make up fuel;

h) a third compressor for recompressing the second membrane stream and means for either recycling this compressed second membrane stream to the steam hydrocarbon reformer unit to be added to the water gas shift effluent to be introduced into the hydrogen pressure swing adsorption unit or to be added to the hydrogen pressure swing adsorption tail gas stream to be introduced into carbon dioxide pressure swing adsorption unit; and i) a means to decompress the two or more beds to remove the carbon dioxide that is adsorbed onto the one or more beds of the carbon dioxide pressure swing adsorption unit and pass this carbon dioxide on for further use.

* * * * *